United States Patent [19]

Cayton

[11] 4,268,201
[45] May 19, 1981

[54] UNITIZING SYSTEM FOR PRODUCE CARTONS AND THE LIKE

[75] Inventor: David W. Cayton, Cupertino, Calif.

[73] Assignee: Bud Antle, Inc., Salinas, Calif.

[21] Appl. No.: 36,564

[22] Filed: May 7, 1979

[51] Int. Cl.³ .................... B65G 57/24; B60P 7/06
[52] U.S. Cl. ................................ 414/35; 220/1.5;
410/1; 410/35; 410/101; 410/111; 410/121;
410/156; 414/43; 414/69; 414/87; 414/97;
414/341; 414/786
[58] Field of Search ............... 414/28, 29, 35, 36,
414/43, 44, 57, 62, 69, 84, 87, 97, 345, 341, 347,
508, 786; 410/1, 31, 32, 35, 101, 102, 107, 110,
111, 116, 121, 122, 123, 140, 156; 187/18;
105/159; 296/3, 24 R, 36; 108/55.5; 206/506,
597; 220/1.5

[56] References Cited

U.S. PATENT DOCUMENTS

| | | | |
|---|---|---|---|
| 1,499,530 | 7/1924 | Henderson | 414/341 X |
| 2,238,233 | 4/1941 | Sloat | 296/24 R |
| 2,588,732 | 3/1952 | Kemp | 206/597 X |
| 2,780,367 | 2/1957 | Perrelli | 414/97 X |
| 3,186,568 | 1/1965 | Spinanger et al. | 414/786 |
| 3,415,567 | 12/1968 | McChesney | 296/3 |
| 3,439,605 | 4/1969 | Hanley | 414/35 X |
| 3,578,182 | 5/1971 | Harvey | 414/43 |
| 3,702,645 | 11/1972 | Shaw | 187/18 |

FOREIGN PATENT DOCUMENTS

526627 3/1954 Belgium ................ 414/62

Primary Examiner—Leslie J. Paperner

[57] ABSTRACT

A carton supporting platform mounted on a vehicle for rotative movement about a vertically extending axis. Rigid side walls are provided on two opposite sides of the platform and are movable between an upright position and an outwardly diverging retracted position. In the upright position the side walls retain parallelepiped produce cartons placed on the platform in a unitized entity during transportation of the same. In order to unload the unitized entity from the carton supporting platform without adversely affecting the integrity of the unitized entity, the platform is pivoted 90° to permit access by a fork lift truck from the side of the vehicle and the side walls are pivoted outward to release the unitized entity. Mechanism for locking the rotative position of the platform and for moving the side walls is provided. Also provided is a method for effecting formation of the unitized entity and for transporting the same without adversely affecting the integrity of the unitized entity.

19 Claims, 24 Drawing Figures

UNITIZING SYSTEM FOR PRODUCE CARTONS AND THE LIKE

BACKGROUND OF THE INVENTION

1. Field of the Invention

This invention relates to an apparatus and method for organizing a plurality of produce cartons or the like into a unitized entity in which the cartons remain during subsequent transportation and processing.

2. Description of the Prior Art

Head lettuce and many other crops are harvested by cutting the heads in the field, placing the cut heads in cartons and then transporting the cartons for further processing and ultimate delivery to the purchaser. As far as is known, prior procedures involve individual handling of the cartons at one or more stages. Individual handling of the cartons is disadvantageous in that it slows movement of the product to the final purchaser, it requires extensive labor and it subjects the produce to damage should the cartons be dropped during handling.

One existing system intended at least partially to ameliorate the above stated disadvantages involves palletizing the produce cartons on a vehicle that is drawn over the harvested field. This approach has not been altogether satisfactory, however, because of the unavailability of procedures for forming in the field a palletized stack of a size corresponding to that which can be conveniently transported in highway vehicles or railroad cars.

SUMMARY OF THE INVENTION

According to the present invention one or more carton supporting platforms are mounted on the bed of a vehicle (a truck and/or a trailer) which is capable of traversing the field from which the produce articles are harvested. The platform is rectangular and on two opposing side edges thereof has upstanding sidewalls which provide lateral support to cartons placed thereon. Adjacent the platform is a stage on which a worker stands while loading cartons onto the platform. Means are provided for raising the stage as the level of the cartons on the platform increases so that the workman is at a convenient height at all times to stack the cartons on the platform without undue physical exertion.

When the platform has been loaded to a desired height, the vehicle on which the platform is mounted is driven from the field to a remotely located processing site, e.g., to a vacuum cooler. Because of the presence of the above noted sidewalls, the pallets remain in a unitized configuration notwithstanding vibration that may occur during transport.

The above noted platform is mounted on the vehicle bed for pivotal movement about a vertical axis so that upon arrival at the processing site, the platform can be rotated 90° to facilitate access by a forklift truck approaching from the side of the vehicle bed. The above mentioned sidewalls are pivotable outward so as to enable the forklift to raise the unitized load from the platform and transport the unitized load for further processing. Because the surfaces at the remote site are typically paved so as to be level and smooth, the unitized load is subject to little if any vibration and therefore does not require the lateral support afforded by the sidewalls.

After the processing of the unitized load, the same can again be transported by a forklift truck into a highway trailer or like vehicle, there being converging guide plates supported at the vehicle door to facilitate entry of the unitized load into the transport vehicle.

An object of the invention is to provide apparatus movable over a relatively irregular agricultural field which facilitates formation of a plurality of produce cartons into a unitized, stable entity. This object is achieved by providing on the bed of a vehicle a carton supporting platform which has on two opposite sides thereof upstanding side walls. Thus cartons placed on the platform receive lateral support from the side walls so as to permit formation of a unitized entity having substantial height.

Contributing to achievement of the foregoing object is a stage adjacent the platform and apparatus for controllably raising the stage as the height of the cartons thereon is increased. Accordingly, a workman standing on the stage can work at a convenient height to avoid over exertion and to facilitate orderly placement of the cartons on the stack.

Another object of the invention is to provide a system wherein the plurality of cartons can be unloaded at a remote site without jeopardizing the unitized entity. This object is achieved by supporting the above noted platform for rotational movement on the vehicle bed in order that at a remote site the platform can be rotated 90° to afford access from the side of the vehicle by a forklift truck or like equipment.

For facilitating removal of the unitized entity from the platform the side walls are pivotally supported at opposite side edges of the platform. Pivoting mechanism is provided for pivoting the side walls outward so as to facilitate unloading of the unitized entity without disturbing the arrangement of the cartons thereon.

Contributing to achievement of the above noted objects is one or more specially constructed "take-or-leave" pallets, which are dimensioned for placement on the platform before cartons are stacked thereon. The carton supporting surface of such special pallets has two sloping segments symmetrical of the center so as to tilt cartons placed thereon slightly toward the center and thus urge the cartons toward the center of the pallet from opposite sides thereof. The pallets are dimensioned so that the biasing force occurs in a direction perpendicular to the supporting force provided by the side walls whereby the pallets are retained in a unitized entity from two orthogonal directions.

Also contributing to maintenance of integrity of the unitized entity during transportation from the field is the provision on the upper edges of the side walls of rope hooks which facilitate lashing the unitized entity with rope during transport thereof. The rope hooks are pivotable to a retracted position to avoid interference with safe loading of the cartons onto the platform and are provided with a plurality of spaced apart hooks so that loads of different heights can be secured.

The foregoing together with other objects, features and advantages of the invention will be more apparent after referring to the following specification and the accompanying drawings.

DESCRIPTION OF THE PREFERRED EMBODIMENT

Referring more particularly to the drawings, reference numeral 21 generally indicates an agricultural vehicle which is adapted for traversal of a field in which crops, such as head lettuce, are growing. Vehicle 21 has a frame which includes longitudinally extending members 22 and 23. Fixed to the respective vehicle frame members and extending parallel thereto are subframe channels 24 and 25. There is a plurality of mounting tabs 25a for facilitating attachment of the subframe channels to the vehicle frame members.

Extending between subframe channels 24 and 25 and secured thereto are transverse channels 26 and 27. Extending in a longitudinal direction between the transverse channels are spaced apart frame members 28 and 29 which form a generally square frame with the transverse channels. Angle members 30 are mounted in the corners of the square frame to form a generally octagonal structure on which is mounted the lower race 31 (see FIG. 5) of a bearing 32, the bearing having an upper race 33 and a plurality of balls 34 which support the upper race on the lower race for relative rotation. Secured to upper race 33 of bearing 32 by means of a threaded fastener 35 is a carton supporting platform 36.

Figure 1:
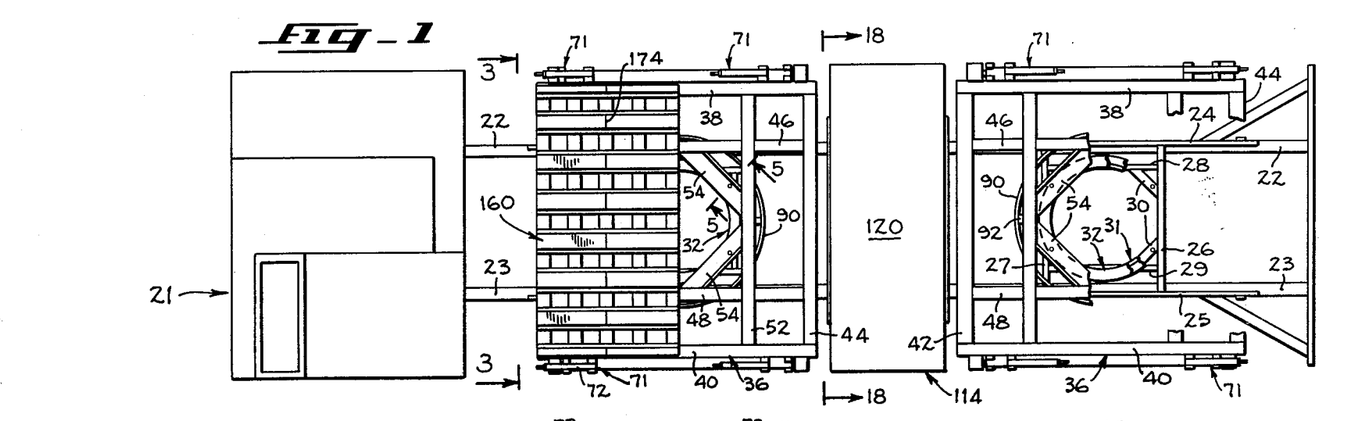
FIG. 1 is a plan view of an agricultural truck provided with equipment according to the present invention, portions of which are broken away to reveal details of construction.
Figures 7, 8, 9, 10, 15, 16, 17:
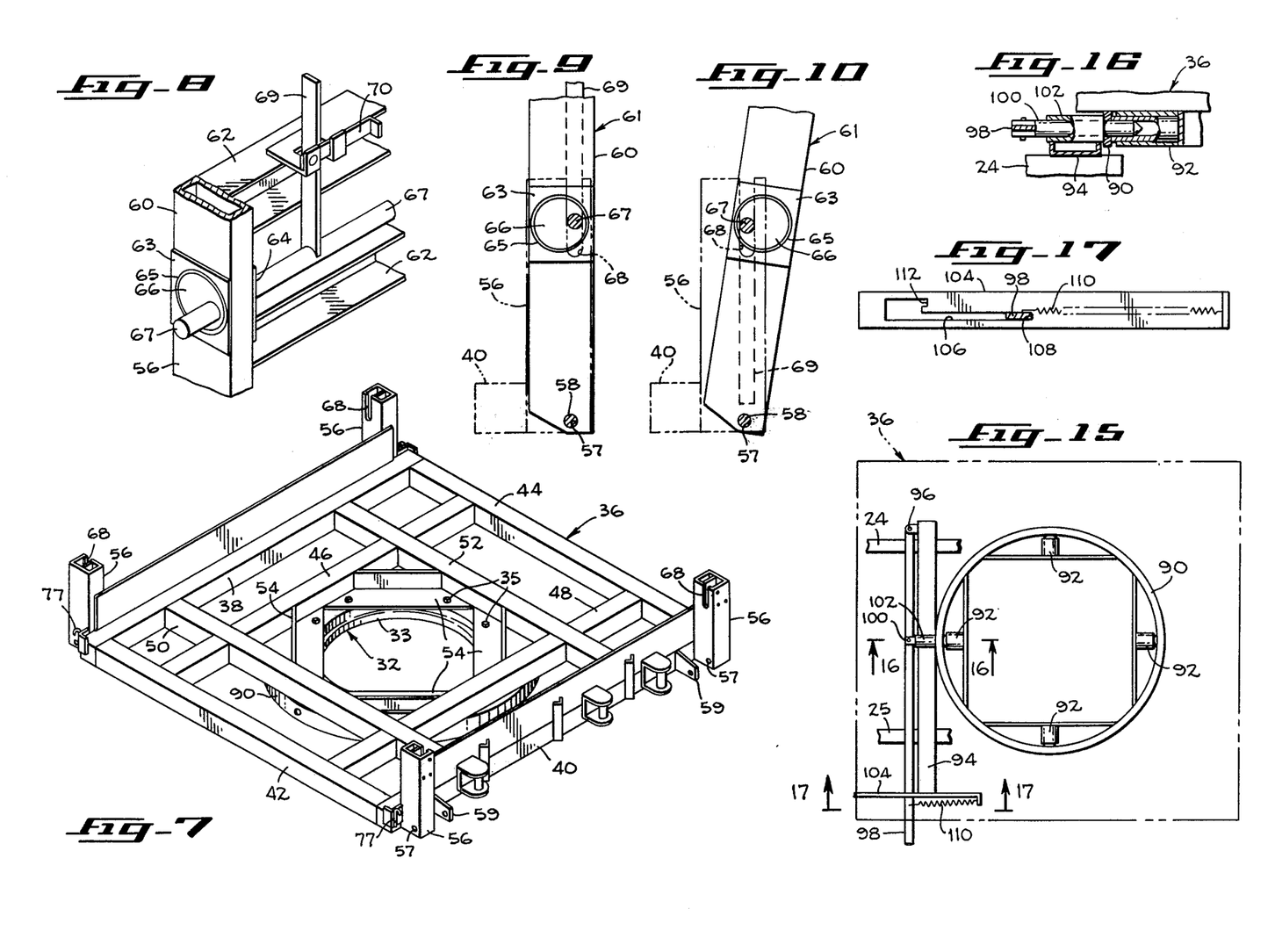
FIG. 7 is a perspective view showing a carton supporting platform of the invention together with a turret on which the platform is mounted for rotative movement on the vehicle bed.
FIG. 8 is a fragmentary perspective view of the mechanism for pivotally positioning the pallet supporting side walls.
FIG. 9 is a side view of the mechanism of FIG. 8 showing the side wall in an upright, pallet supporting position.
FIG. 10 is a view similar to FIG. 9 showing the side wall in a sloped position to afford release of the cartons.
FIG. 15 is a plan view of the turret mechanism for mounting the pallet supported platform and controlling the rotative movement thereof.
FIG. 16 is a section taken along line 16—16 of FIG. 15 showing the lock mechanism for fixing the rotative position of the carton supporting platform.
FIG. 17 is a cross-sectional view taken along line 17—17 of FIG. 15 showing the lever control mechanism for the lock mechanism of FIG. 15.
Figure 11:
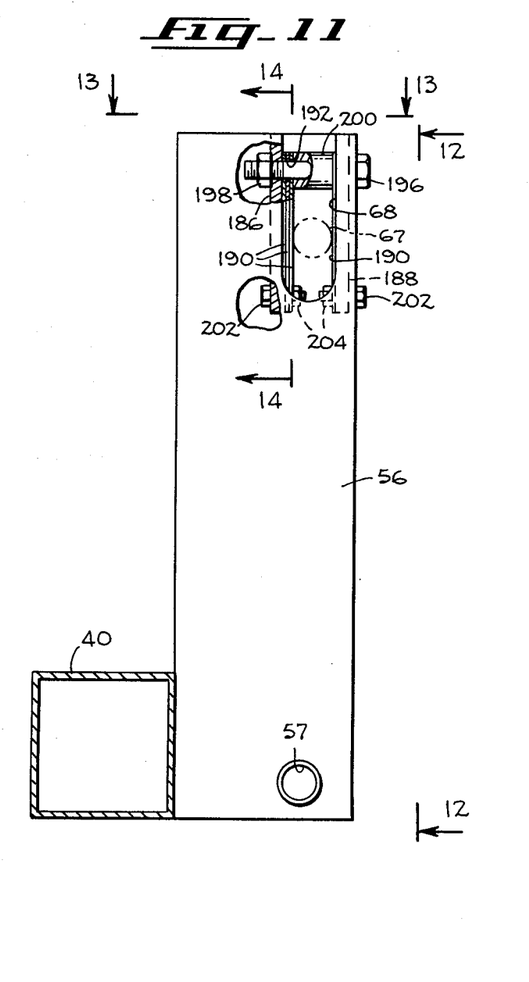
FIG. 11 is an enlarged elevation view similar to FIG. 9 and showing certain internal parts.

Carton supporting platform 36, as seen in FIGS. 1 and 7, is substantially square in outlinear form. The carton support platform has a frame which includes side edge members 38 and 40 and end edge members 42 and 44. Carton support platform 36 also includes inner longitudinal members 46 and 48 which are parallel to side edge members 38 and 40 and inner transverse members 50 and 52 which are parallel to end edge members 42 and 44. As can be seen in the drawings the inner frame members form an inner square frame. There are obliquely extending corner members 54 fixed within the inner square frame to which upper bearing race 33 is mounted. Thus carton supporting platform 36 can be rotated about a vertical axis.

Extending upward from each corner of carton support platform 36 at the extremities of side edge members 38 and 40 are substantially identical base brackets 56. As can be seen in FIG. 7 the brackets are of hollow rectangular cross-sectional shape and define near their lower extremities bores 57. The bores support respective pivot shafts 58, the opposite ends of which are carried by a coaxial hole in a plate 59 which is secured to the respective side edge members. Mounted on the pivot shaft between base bracket 56 and plate 59 are vertical frame members 60 which are elements of side frames 61 which also include horizontal frame members 62. Side frames 61 are pivotable on the axes of pivot shafts 58 between an upstanding position (seen in FIGS. 3 and 9) and an outwardly sloping or diverging position (seen in FIG. 10).

Referring to FIG. 8, vertical frame member 60 is seen to have a hollow rectangular cross-sectional shape which at a location above the axis of pivot shaft 58 is reinforced by pads 63 and 64. The pads and the side walls of vertical frame member 60 are bored to form a large diameter circular opening in which is fixed a bushing 65. Disposed within aligned pairs of such bushings are cylindrical cams 66 which are fit to be rotatable within the bushing. Eccentric of the central axis of the cams is a shaft 67 which projects beyond vertical frame member 60 and engages the walls of a slot 68 in a side wall of base bracket 56. As can be seen in FIGS. 9 and 10 rotation of shaft 67 through 180° causes corresponding rotation of cam 66. For so rotating the shaft there is an operating handle 69. As seen in FIG. 9, when the circumferential portion of cam 66 that is farthest from shaft 67 is at a nine o'clock position with respect to the axis of the shaft, the cam positions side frame 61 in a substantially vertical position. As seen in FIG. 10, in which operating handle 69, shaft 67 and cam 66 are in a position displaced 180° from that shown in FIG. 9, side frame 61 is sloped outward, the angle of slope in one structure designed in accordance with the invention being about 7½°. For securing the side frame in an upright position (shown in FIGS. 3 and 9) a latch mechanism 70 is mounted on a horizontal frame member 62 which constitutes a part of side frame 61. Latch mechanism 70 is spaced from shaft 67 in alignment with operating handle 69 and is adapted to releasably engage the operating handle in the upward position thereof.

Figures 4, 5, 6:
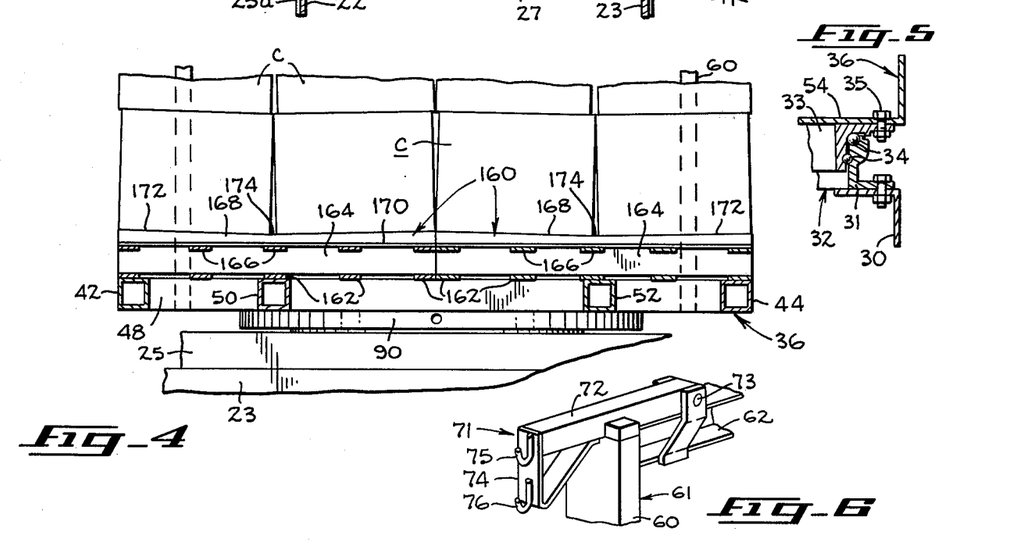
FIG. 4 is a fragmentary section taken along line 4—4 of FIG. 3.
FIG. 5 is a fragmentary section of a turret bearing that supports the platform for rotational movement taken along line 5—5 of FIG. 1.
FIG. 6 is a fragmentary view in perspective of a roping arm assembly according to the present invention.

At each upper corner of side frame 61 is a roping arm assembly 71, shown in detail in FIG. 6. Roping arm assembly 71 includes an arm 72 joined to horizontal frame member 62 at a pivot 73. The end of arm 72 remote from the pivot extends beyond the edge of side frame 61, there being a rigid plate 74 secured to the outer end of the arm. Fixed to plate 74 is an upper rope hook 75 and a lower rope hook 76. The rope arm can be pivoted to a retracted position by moving the arm in a clockwise direction, as viewed in FIG. 6, until arm 72 lies upon the upper surface of horizontal frame member 62. For cooperating with rope hooks 75 and 76 on roping arm assembly 71, a plurality of lower rope hooks 77 are secured to the edge of carton supporting platform 36.

Carton supporting platform 36 is rotatable between a loading position shown in FIG. 1 and an unloading position which is 90° from the position in such figure. For locking carton supporting frame 36 in such position, the apparatus includes a locking mechanism depicted most clearly in FIGS. 15–17. Fixed to the bottom surface of carton supporting platform 36 there is a locking ring 90. The ring is concentric of bearing 32. Ring 90 defines outwardly accessible sockets 92 at 90° intervals therearound, the central axes of the respective sockets being perpendicular to the side and end edges of carton supporting platform 36. Fixed to the subframe members 24 and 25 in tangential orientation to ring 90 is a latch support member 94 which includes a pivot 96 to which a latch operating lever 98 is pivotally supported. In alignment with the axis of rotation of ring 90 there is a latch pin 100 pivotally secured to the operating lever. A sleeve 102 secured to support member 94 constrains latch pin 100 for movement radially of locking ring 90 so that pivotal movement of operating rod 98 about pivot 96 moves latch pin 100 into and out of engagement with one of sockets 92 in the locking ring. As seen most clearly in FIG. 15, operating lever 98 extends outward so as to be accessible from the side of vehicle 21. Adjacent the exterior end of the lever and in spaced apart relation to pivot 96 is a lever guide 104. Guide 104 defines a lever guide slot 106 through which lever 98 extends. Slot 106 has an inner extremity 108 which is positioned such that when lever 98 abuts the inner extremity, latch pin 100 is engaged in one of the ring sockets 92. A biasing spring 110 extends between the operating lever 98 and an extension on the extremity of guide plate 104 for biasing the lever and latch pin 100 into engagement with the sockets in the ring. At the end of guide slot 106 opposite from inner extremity 108 is a notch which forms an abutment 112 into which operating lever 98 can be moved to hold the lever and latch pin 100 in an outward or disengaged position against the force of spring 110 in order that pallet supporting platform 36 can be rotated about the central vertical axis.

Figure 18:
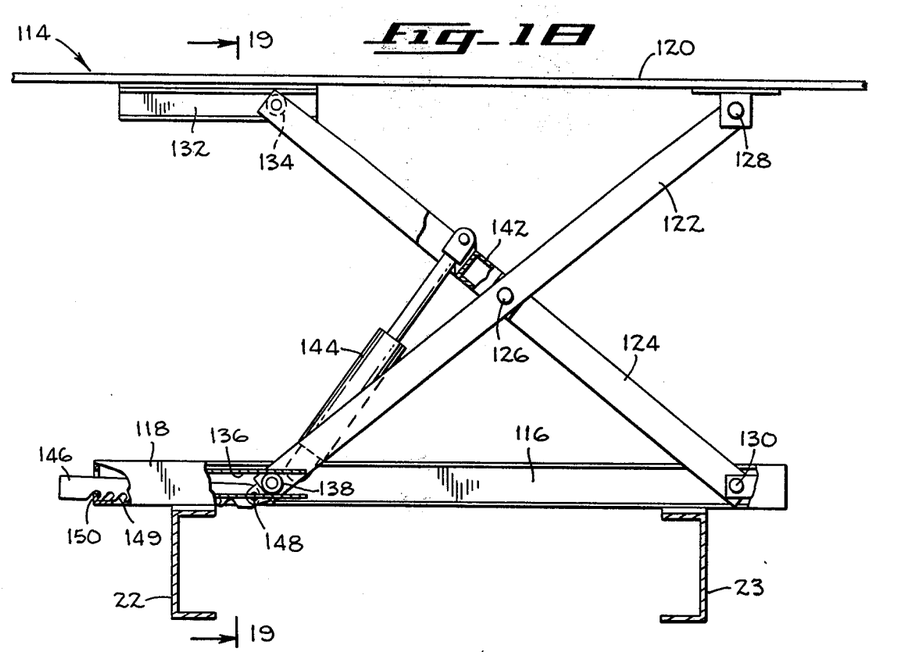
FIG. 18 is a transverse sectional view taken along line 18—18 of FIG. 1 and showing the workman supporting stage and the mechanism for controlling the vertical height thereof.
Figure 19:
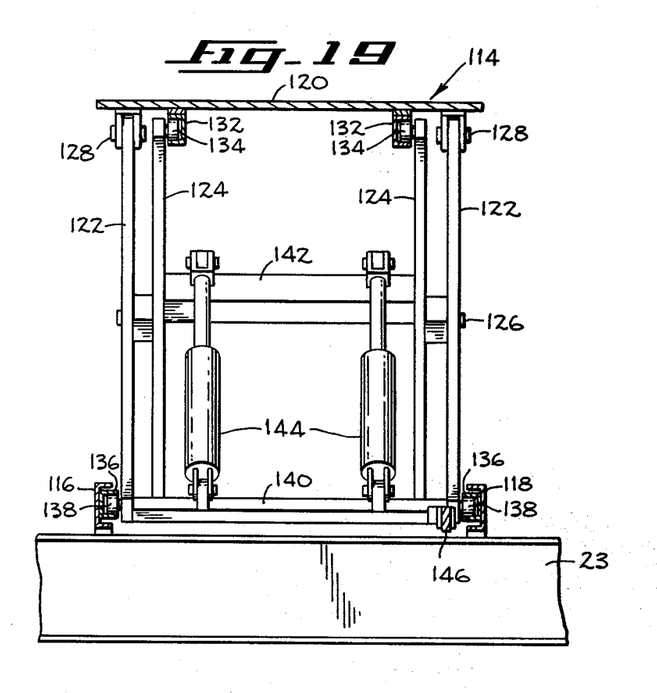
FIG. 19 is a view taken along line 19—19 of FIG. 18.

Because the front and rear carton supporting frames 36 and their associated mounting mechanism are identical, the above description of one of the platform assemblies suffices for a description of all. As can be seen in FIG. 1, the two assemblies are longitudinally spaced apart on truck frame members 22 and 23 and define a space therebetween in which is mounted a workman supporting stage 114. As can be seen in FIGS. 18 and 19, stage 114 is supported on channels 116 and 118 which are secured in transverse spanning relation on truck frame members 22 and 23. The supporting stage includes a stage plate 120 and mechanism for maintaining the stage plate in a horizontal orientation and for raising and lowering the same. Such mechanism includes right and left pairs of intersecting arms 122 and 124 which pivot at their approximate centers on a pin 126. As can be seen in FIG. 19, arms 122 are outer arms and arms 124 are inner arms. The upper end of arm 122 is pivoted to the lower surface of stage plate 120 at 128 and the lower end of arm 124 is pivoted to a cross member (116, 118) at 130. The upper end of arm 124 is supported for sliding movement on the underside of stage plate 120 by means of a groove forming member 132 rigid with stage plate 120 and a roller 134 secured to the upper end of arm 124 which is movable along the groove formed by member 132. The lower end of arm 122 is similarly supported, there being a slot forming member 136 secured to transverse subframe members 116 and 118 and a roller 138 secured to the lower extremity of link 122 and movable within the groove. Outer arms 122 are joined by a lower cross bar 140 and inner arms 124 are joined by a cross bar 142. Extending between such cross bars are hydraulic actuators 144, extension of which pivots the inner and outer arms relative one another in scissor-like fashion to raise or lower stage plate 120.

For safety purposes, in the event of some failure in actuators 144 and the hydraulic system associated therewith, there is a ratchet bar 146 the inner end of which is pivotally joined as at 148 to the lower end of cross bar 140. Ratchet arm 146 extends generally horizontally outward therefrom and defines on its lower edge a plurality of slots which define outwardly facing ratchet tooth surfaces 149. Mounted rigid with vehicle frame members 22 and 23 and subframe members 116 and 118 is a fixed pawl 150 which engages tooth surfaces 149. The weight of ratchet arm 146 outward of the pawl gravitationally biases the arm downward to assure engagement between tooth surfaces 149 and pawl 150. Because the surfaces of the slots opposite the teeth are sloped, movement of bar 146 inward as stage plate 120 is raised is permitted. Reverse motion is impossible because of engagement between teeth 149 and pawl 150 unless arm 146 is pivoted upward about pivot 148.

Figure 3:
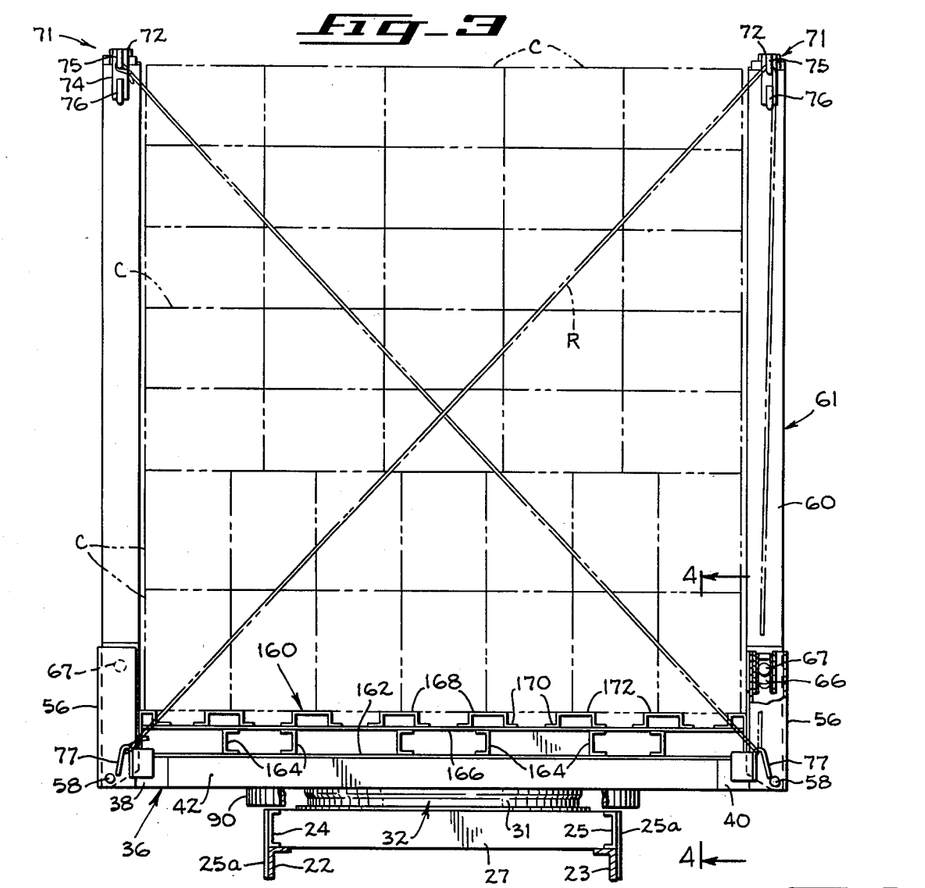
FIG. 3 is a transverse elevation view taken along line 3—3 of FIG. 1.

For facilitating, unloading and subsequent handling of a unitized carton load formed according to the present invention, there are provided a plurality of take-or-leave pallets 160. As can be seen in FIGS. 1 and 3, take-or-leave pallet 160 has a length corresponding to the width or transverse dimension of pallet support platform 36 so that the pallet can fit within opposite base brackets 56. As seen in FIG. 1, the width of the pallet is equal to ½ the longitudinal dimension of carton support frame 36 so that two pallets totally cover the upper surface of the pallet support frame. Typically the pallet, the support frame and the cartons are dimensioned so that the width of the pallet is equal to twice the length of the cartons. By way of example only, one take-or-leave pallet designed in accordance with the present invention has a length of approximately 84 inches and a width of approximately 44 inches.

Each pallet includes a plurality (five in the embodiment shown in the drawings) of base strips 162 which extend along the length of the pallet. Extending transversely of the base strips are channel members 164 to the upper surface of which are secured top strips 166 which extend parallel to bottom strips 162. Mounted on the upper surface of top strips 166 are spaced apart fabricated risers 168 which have side flanges 170 which facilitate welding the risers to top strips 166. The risers also include surface forming webs 172 on which the cartons reside. As can be seen in FIG. 3, risers 168 are dimensioned and mounted such that the interval between adjacent webs 172 corresponds to a dimension of the cartons, and the space between adjacent risers permits entry therebetween of a forklift tine. Additionally, the width of each riser is established so that a forklift ine can enter beneath web 172.

Referring to FIG. 4 it will be seen that the upper surface of risers 168, i.e., the upper surfaces of webs 172, taper downward and inward of the edges of the pallet so that, as seen in the figure, two cartons supported on webs 172 will be urged inward toward a center point 174 at which the two tapering surfaces intersect. Obviously the elevation of point 174 is lower than the elevation of the outer extremities of the web. Thus in the direction in FIG. 4 the cartons will be biased inward into a unitized stack by the tapering configuration of the risers, and as seen in FIG. 3 the cartons will be confined in a unitary stack by the presence of pivotable side walls 61.

Figure 2:
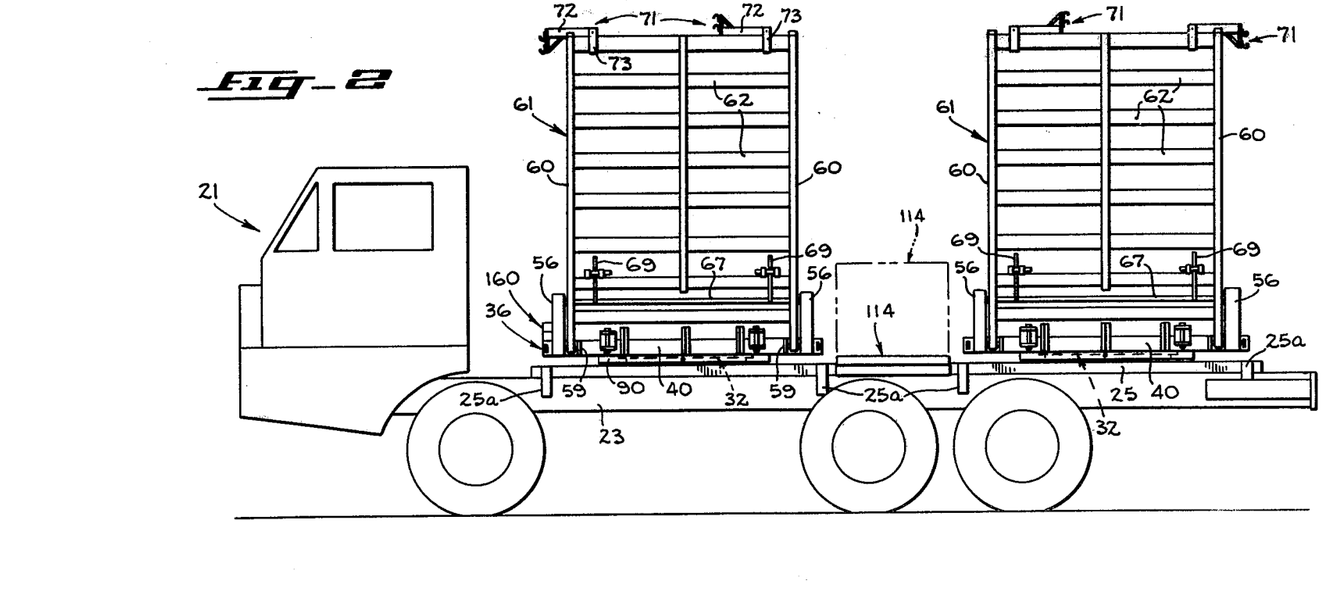
FIG. 2 is an elevation view of the truck of FIG. 1.
Figure 20A:
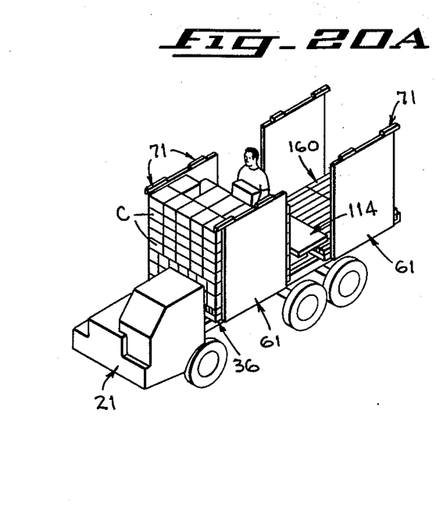
FIGS. 20A–20E are diagrammatic perspective views showing the apparatus of the invention as employed in practicing the method of the invention.
Figure 20B:
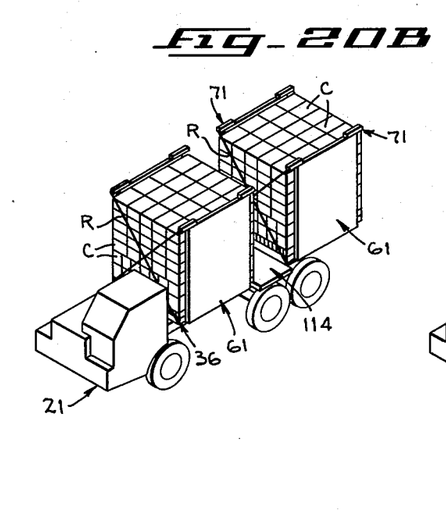

In operation turntables 36 are positioned as shown in FIG. 1, i.e., with carton supporting platforms rotationally oriented such that side walls 61 are oriented longitudinally of vehicle 21. Stage 114 is moved to its lowermost position, the raising of the outer extremity of safety ratchet arm 146 being necessary to so position the stage. Vehicle 21 is then driven across a field in which agricultural products (e.g., lettuce heads) have previously been severed from the field and packed in rectangular cartons such as those identified at C in FIG. 3. A workman standing on the field surface lifts one of the cartons and hands the same to a workman standing on stage 114. The latter workman then places carton C onto pallet 160, which is supported on carton supporting platform 36. Such procedure, shown pictorially in FIG. 20A, is repeated until each of the pallets is loaded as shown in FIGS. 3 and 20B, the mechanism depicted in FIGS. 18 and 19 being activated at appropriate times for raising workman supporting stage 114 as the level of the carton stack on the pallets increases. When the pallet stack is complete on both of the platforms, rope arm assemblies 71 are pivoted into the operative position, i.e., the position shown in FIGS. 2, 6 and 20B. Next a rope or cable R is installed around the hooks on the arm assemblies and hooks 77 that are rigid with the lower portion of the carton supporting frame so that the sides of the carton stack orthogonal of side walls 61 are firmly confined. The overall height of the pallet stack dictates whether upper hook 75 or lower hook 76 is used. The size of the cartons and the size of the lettuce heads packed therein determines the overall height of the stack. Thereafter vehicle 21 is driven to a processing or transfer station remote from the field.

As the cartons are stacked on the pallet supporting platform as described above, the tapering configuration of the upper surface of take-or-leave pallets 160 prevents the cartons from falling toward or away from the workman standing on stage 114, and side walls 61 prevent the cartons from falling outward of the sides of the vehicle. Thus a stable unitary stack of cartons can be conveniently formed. This can be done without undue exertion by the workman standing on stage 114 because through energization of actuators 144 the height of the stage can be increased as the height of the stack of cartons increases. Moreover, the safety of the workman is assured by virtue of engagement between teeth 149 on safety arm 146 and pawl 150, safety being assured even in the unusual event of failure in the hydraulic system of which actuators 144 are a part.

Figure 20C:
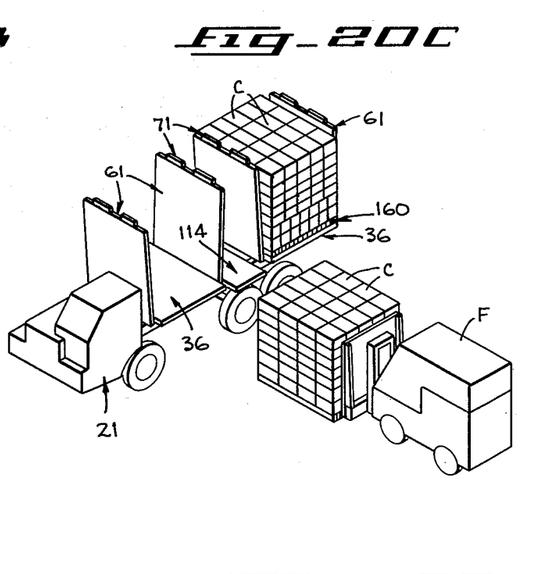

When the loaded vehicle has reached a remote site for unloading or further processing (see FIG. 20C), rope R is removed, stage 114 is lowered and rope arm assemblies 71 are pivoted to a retracted position. Operating handle 98 shown in FIGS. 15-17 is then moved against the force of spring 110 through slot 106 and into engagement with abutment 112. This withdraws locking pin 100 from engagement with socket 92 and permits rotation of pallet support platform 36 and the unitized pallet stack formed thereon. Because of the presence of turret bearing 32 and the fact that the load thereon is well balanced, such rotation of the platform can be accomplished manually without undue strain. When the platform has been rotated 90° to a position at which side walls 61 extend transversely of the vehicle, operating lever can be moved back to the opposite extremity 108 of slot 106 so as to engage locking pin 100 into a socket 92 which is spaced 90° from the originally engaged socket. Next levers 69 (seen in FIGS. 8-10) are released from latch mechanism 70 and pivoted 180° to the position shown in FIG. 10. This causes side walls 61 to pivot outward so that the unitized pallet stack can be removed with a forklift truck indicated at F in FIG. 20C. Because the unloading occurs only at surfaces which are paved or otherwise smooth and level, the integrity of the unitized carton stack is maintained notwithstanding removal from between side walls 61. Moreover, presence of inwardly sloping surfaces on take-or-leave pallets 160 contributes to the stability of the carton stack.

Figure 20D:
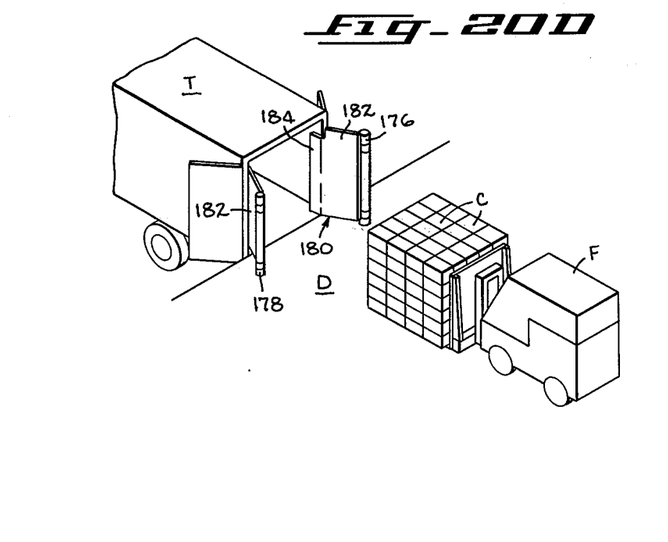

The carton stack can then be transported on smooth surfaces by means of forklift truck F for further processing. For example, in the case of head lettuce the stack is typically introduced into vacuum cooling apparatus which is sufficiently large that the entire stack can be handled in a batch manner. During such further processing the integrity of the stack is maintained, primarily because of the presence of take-or-leave pallets 160 on which the stack is supported. When processing is complete it is desirable that the carton stack be promptly loaded into a transport vehicle, such as a semi-trailer T shown in FIGS. 20D and 20E. In those figures the trailer is shown backed against the edge of a loading dock D which has a smooth and level surface. Before the carton stack is loaded into the truck, it is removed from take-or-leave pallet 160 because the take-or-leave pallets are relatively expensive and cannot economically be shipped. To so raise the unitized stack the tines of forklift truck F are inserted in the spaces between adjacent risers 168 so that the riser remains on the floor of dock D when the forklift tines are raised. Thereafter the unitized stack is loaded into the vehicle T.

Figure 20E:
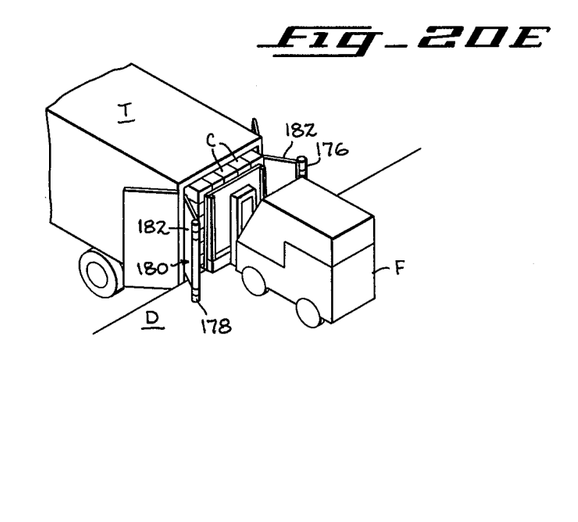

For facilitating such loading and to maintain the cartons in a unitized stack there are installed at dock D spaced apart upstanding posts 176 and 178. The posts are spaced from one another by an amount in excess of the width of the unitized carton stack and the width of forklift truck F. Mounted on posts 176 and 178 for pivotal movement about the vertical axes of the posts are guide plates 180 each of which has a guiding surface 182 which converges from the posts into the interior side walls of vehicle T, there being a flange 184 at the inner extremity of the guide plates which lies flush against the interior wall of the truck and limits the pivotal movement of the guide plates. Thus as the load is moved between posts 176 and 178 the unitized carton stack is guided into the vehicle interior and any tendency of the cartons to spread out or otherwise become dislodged from the unitized stack is avoided. As seen in FIG. 20E, proper dimensioning of the apparatus of the invention, the cartons and the interior of truck T assures that the truck will be fully loaded. It will be apparent that successive unitized stacks can be loaded into truck T in a rapid and efficient manner so that the truck can proceed while the produce carried in the cartons is fresh. When the truck is loaded, guide plates 180 can be pivoted out of the way to permit the truck doors to be closed and to permit an empty truck to be positioned for loading.

Figure 14:
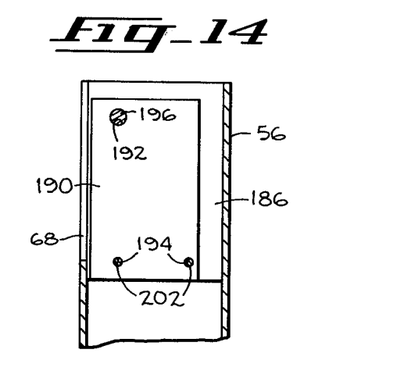
FIG. 14 is a section taken on line 14—14 of FIG. 11.

Formation of a stable unitized pallet stack depends in large part on the vertical orientation of side walls 61 during initial formation of the stack. To assure such vertical orientation of the side walls without imposing unduly stringent manufacturing tolerances and in the presence of wear on the parts, the present invention provides a shimming system shown in FIGS. 11-14. Spanning the interior of base bracket 56 in alignment with slot 68 are backing plates 186 and 188. The backing plates are welded or otherwise permanently fixed interior of the base bracket. The backing plates as well as the outer wall of base bracket 56 are bored in a pattern, seen in FIGS. 12 and 14, to accommodate a plurality of flat shims 190. The backing plates are bored to form holes which register with an upper hole 192 and one or more lower holes 194 in the shims. An asymmetrical arrangement for holes 192 and 194 facilitates proper orientation of the shims. There is a bolt 196 having a diameter and length sufficient to pass through shim holes 192 and the holes in registry therewith that are formed in backing plates 186 and 188. A nut 198 is provided for threaded engagement with bolt 196. A tubular spacer 200 is also provided with a central hole for passage therethrough of bolt 196, the axial extent of spacer 200 being such that when added to the aggregate thickness of several shims 190, it will tightly support the shims and the spacer between backing plates 186 and 188. Smaller bolts 202 and corresponding nuts 204 are provided for passing through shim holes 194 and the corresponding holes bored in backing plates 186 and 188 for securing the lower extremities of the shims.

Figure 12:
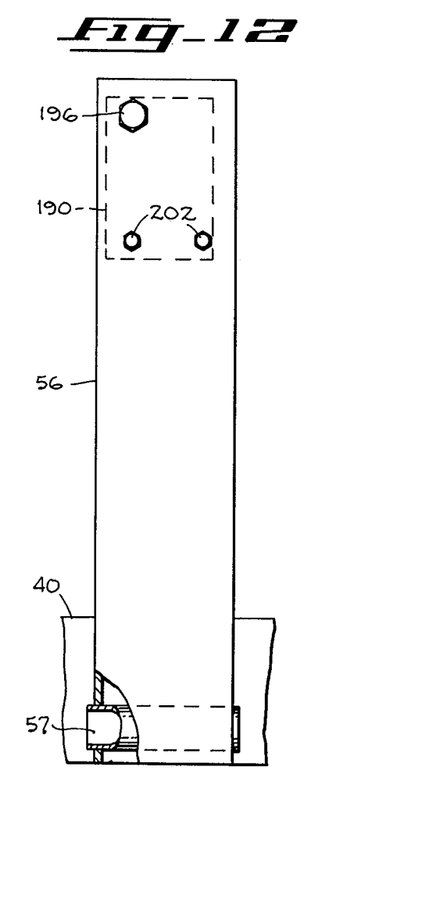
FIG. 12 is a side view taken on line 12—12 of FIG. 11.
Figure 13:
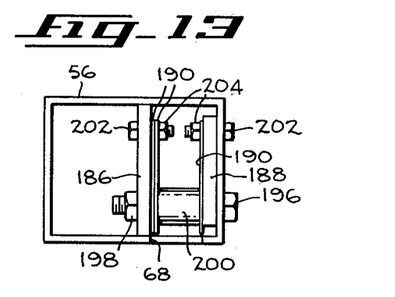
FIG. 13 is a top view taken on line 13—13 of FIG. 11.

In FIG. 12 shaft 67 is shown in broken lines within slot 68 and between shims 190 disposed on opposite sides of the slot and opposite ends of spacer 200. Should such position of shaft 67 position side walls 61 in a non-vertical orientation when lever 69 is engaged with latch mechanism 70, bolts 196 and 202 can be removed and one or more shims 190 can be moved from one side of slot 198 to the other side of the slot until the vertical position is established. When the adjustment has been achieved, sleeve 200 and the bolts are reinserted and tightened, and the apparatus is again ready for use. Thus it will be seen as the parts of the side wall tilting mechanism wear, as they will in the rugged environment of use of the present invention, the verticality of the side walls can be assured by adjusting the shims as described above.

Thus it will be seen that the present invention provides a system, including both apparatus and method whereby cartons of agricultural products can be gathered from a field, placed in a stable unitized stack and transported, processed and loaded without impairing the integrity of the unitized stack. Consequently the time and cost of handling the produce contained in the cartons is minimized and the quality of the product in the cartons is assured, because of the elimination of repeated handling of separate cartons. Although the invention has been described hereinabove as being supported on a self powered vehicle, it will be obvious that the apparatus can be installed on a trailer. In fact, in one system designed in accordance with the invention, a trailer, having two pallet supporting platforms 36 mounted thereon together with the associated mechanism, is towed behind the vehicle shown in FIGS. 1 and 2 so that four unitized pallet stacks are formed on each pass of the field. Although one embodiment of the invention has been shown and described it will be obvious that other adaptations and modifications can be made without departing from the true spirit and scope of the invention.

What is claimed is:

1. Apparatus for facilitating organization and transport of a plurality of generally parallelepiped shaped cartons comprising a rectangular platform defining a carton supporting surface and having first and second mutually parallel side edges and a pair of mutually parallel end edges perpendicular to the side edges, means for mounting the platform on a vehicle bed for rotative movement about a generally vertical axis between a loading position at which the side edges are oriented longitudinally of the vehicle bed and an unloading position at which the end edges are oriented longitudinally of the vehicle bed, first and second generally planar side walls being mounted to respective said side edges of said platform for movement between an inward upright position to support cartons disposed on said platform and an outward position at which said side walls disengage said cartons, and means for controllably moving said side walls between the upright position and the outward position.

2. Apparatus according to claim 1 in combination with a stage defining a horizontal person supporting surface, means for mounting said stage on said vehicle bed adjacent said platform and means for selectively raising and lowering said stage.

3. Apparatus according to claim 2 wherein said stage raising and lowering means comprises first and second rigid intersecting arms, third and fourth rigid intersecting arms, first means for pivotally joining said first and second arms at their mid-regions to form a first scissor-like mechanism, second means for pivotally joining said third and fourth arms at their mid-regions to form a second scissor-like mechanism, means for pivotally attaching the upper ends of said first and third arms to the under surface of said stage in spaced apart coaxial relation, means defining a pair of spaced apart channels for attachment rigid with said vehicle bed for constraining the lower ends of said first and third arms for movement along parallel linear paths, means for pivotally attaching the lower ends of said second and fourth arms rigid with said bed in spaced apart coaxial relation, means defining a pair of spaced apart channels secured to the under side of said stage for constraining the upper ends of said second and fourth arms for movement along parallel linear paths so that said stage moves with respect to the vehicle bed in response to pivoting movement of said first and second scissor-like mechanisms, and means for controllably driving said scissor-like mechanism about said pivotally joining means for raising and lowering said stage.

4. Apparatus according to claim 3 wherein said controllable driving means comprises an actuator having a cylinder, a piston slidable in said cylinder and a rod connected to said piston and extending exterior of one end of said cylinder, means for fastening said cylinder rigid with said first arm, means for fastening said rod rigid with said second arm, and means for introducing pressurized fluid into said cylinder to move said piston therealong.

5. Apparatus according to claim 4 in combination with safety means comprising a lever arm having one end pivotally fastened to said first arm below said first pivotally joining means, said lever arm having at the other end thereof a plurality of teeth on the under side thereof, a pawl rigidly attachable to said vehicle bed for cooperating with and engaging said teeth, said teeth being sloped upward and inward so that said lever moves over said pawl as said stage is raised and so that said teeth engage said pawl when said stage is lowered, said lever being yieldably biased toward said pawl for establishing contact between said teeth and said pawl.

6. Apparatus according to claim 1 in combination and said outward position at which said side walls diverge upward and outward of said platform, a first base bracket fixed to an end of said first side edge and extending upward of said carton supporting surface, a second base bracket fixed to an end of said second side edge and extending upward of said carton supporting surface, first and second mechanisms operatively connecting respective base brackets and said side walls for effecting pivotal movement of said sides to an upright position and to an outward position.

13. Apparatus according to claim 12 wherein said first and second mechanisms each include a portion of said base bracket defining a substantially vertically elon- 18. A method according to claim 16 including the steps of providing a person supporting stage adjacent the carton supporting platform and raising the stage in correspondence with the height of the carton layers on the platform.

19. A method according to claim 16 wherein the lifting step includes the steps of introducing the tines of a fork lift truck beneath the cartons in the unitized entity, moving the fork lift truck with the unitized entity thereon toward a transport vehicle having an enclosure with an opening slightly larger than the cross sectional shape of the unitized entity, installing a pair of plates at the transport vehicle opening with outer edges of the plates spaced at a distance greater than the width of the opening and converging to inner edges supported substantially coextensive with the vehicle opening, and driving the fork lift through the opening into the transport vehicle, the converging plates guiding the unitized entity thereinto.

* * * * *